United States Patent Office 3,518,219
Patented June 30, 1970

3,518,219
NOVEL POLYIMIDE FORMING MIXTURES
Edward Lavin, Longmeadow, and Albert H. Markhart, Wilbraham, Mass., and Robert E. Kass, Simsbury, Conn., assignors to Monsanto Company, St. Louis, Mo., a corporation of Delaware
No Drawing. Continuation-in-part of application Ser. No. 562,458, July 5, 1966, which is a continuation-in-part of application Ser. No. 200,634, June 7, 1962. This application Aug. 31, 1967, Ser. No. 664,618
Int. Cl. C08g 20/32
U.S. Cl. 260—33.4   22 Claims

ABSTRACT OF THE DISCLOSURE

Disclosed herein are compositions based on polyamines and ester derivatives of trimellitic acid which can be coated on a substrate and polymerized in situ to provide polyimide resins.

CROSS-REFERENCES TO RELATED APPLICATIONS

This invention is a continuation-in-part of our co-pending application Ser. No. 562,458, filed July 5, 1966 now Pat. No. 3,347,808 which in turn was a continuation-in-part of our co-pending application Ser. No. 200,634, filed June 7, 1962 and now abandoned.

BACKGROUND OF THE INVENTION

Field of the invention

The present invention relates to compositions based on polyamines and diester derivatives of trimellitic acid. These reactants may be dissolved in an organic solvent, coated on a substrate and polymerized in situ to form durable polyimide resins.

Description of the prior art

Polyamide acids and polyimides are taught broadly in U.S. Pats. 3,179,614, 3,179,633, 3,179,634 and 3,190,856. However, these patents do not show the relatively stable solutions of polyamines and the diester derivatives of trimellitic acids of the present invention.

Loncrini in U.S. Pat. 3,182,073 teaches derivatives of trimellitic anhydrides similar to those taught in the present invention. However, he fails to teach the ester derivatives of these compounds and the relatively stable solutions of reactants which may be coated on a substrate and polymerized in situ to form polyimide resins.

The prior art such as Edwards (II) and Lavin et al. (U.S. Pats. 3,179,634 and 3,190,856, respectively) teach the reaction of a tetracarboxylic dianhydride and a diamine to form a soluble polyamide acid which may be heat cured to form an insoluble polyimide resin. This reaction may be represented generally as follows:

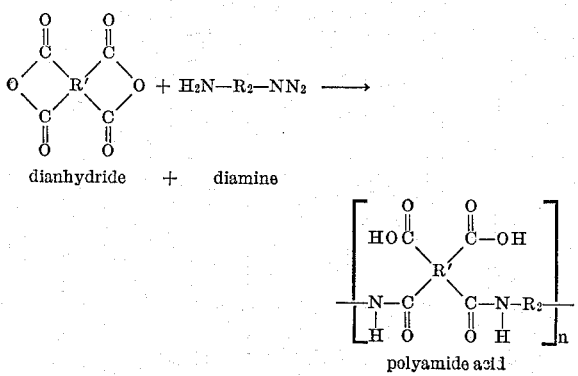

dianhydride + diamine polyamide acid

This reaction occurs spontaneously even at room temperature due to the great reactivity of the dianhydride as is evidenced by Example 1 of Edwards (II). The substantially linear soluble polyamide acid of this reaction may be converted by the use of heat to an insoluble polyimide which may be represented generally as follows:

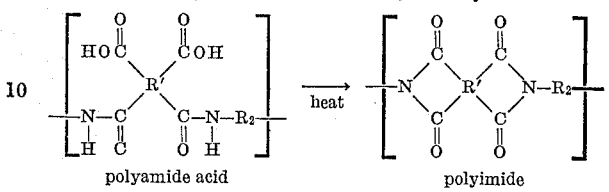

polyamide acid → polyimide

Here the predominate reaction is one of cyclicization or imidization to give polyimides as illustrated generally above.

The present invention calls for the use of tetracarboxylic free acids and/or their ester derivatives and not the dianhydrides of the prior art. These acids and esters lack the reactivity of the corresponding dianhydrides, which dianhydrides cannot be construed to be equivalent to the free acids and/or esters in the present invention. Consequently applicants are able to provide high solids solutions of the monomeric reactants which can be represented generally as follows:

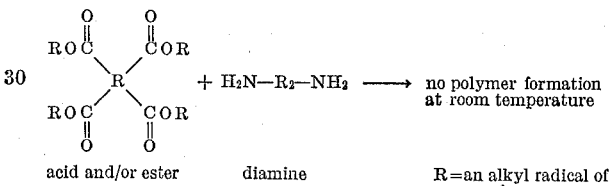

acid and/or ester + diamine → no polymer formation at room temperature

R = an alkyl radical of from 1 to 6 carbon atoms. R' represents a tetravalent radical.

The monomeric nature of the reactants allows one to prepare high solids solutions whereas the solids content of the polymeric solutions is limited by the increasing viscosity of the polymer.

The monomeric type solutions of the present invention may be coated on a substrate and polymerized in situ with the use of heat to give a polyimide resin with improved physical properties, e.g. bond strength over those resins prepared by the conventional dianhydride-diamine reaction of the prior art.

SUMMARY OF THE INVENTION

This invention relates to compositions which can be heat cured to flexible, tough, adherent, heat resistant and dielectric materials; more particularly, it relates to certain insulative and impregnating varnishes compounded with monomers that may be condensed in situ to resins of excellent binding power. The resins find use in such diverse applications as electrical insulators, glass laminates, heat resistant structural adhesives, varnishes, films, etc.

The employment of synthetic resins for electrical insulation is not new. In fact, many have found wide commercial acceptance in such applications as, for instance, magnet wire coating. In that process, wire of an appropriate gauge is first successively covered by means of a specialized technique with multiple layers of one or more enamels. The covered wire is then wound into coils for incorporation into motors, generators and the like. Prior to final assembly however, the stator and rotor coils are dipped into special varnishes which when baked will form a firmly binding envelope and will, in addition, often contribute to the total insulation of the system.

For the convenience of the trade and in reference to the operating temperatures to which the enameled and varnished wire coils are ultimately destined, a classification has been developed and applied to such enamels and varnishes (American Institute of Electrical Engineers, Insulation classification No. 1, June 1957). These classes range from 90° C. to 220° C. A class 220° C. enamel or varnish, for instance, will be employed in equipment designed for use at temperatures of 220° C. or higher. It is with this enamel and varnish class that the present invention is primarily concerned.

The introduction of synthetic organic resins in enamels of this 220° C. class is a rather recent development in the art. Nevertheless, because of an excellent balance of properties as compared to the inorganic materials constituting the bulk of the class, the new materials are already used extensively. With this development, however, has arisen the need for new varnishes capable of performing satisfactorily under the rigorous thermal conditions attending the employment of such polymers.

It is therefore, an object of this invention to provide a varnish suitable for bonding electrical components or for impregnating substrates to be laminated and particularly for use on 220° C. rated magnet wire, capable of developing adequate bond strength at elevated temperatures while being at the same time compatible with the magnet wire film insulation.

It is another object of this invention to provide novel compositions of matter.

It is another object of this invention to provide laminates impregnated with a varnish having excellent heat stability properties.

It is another object of this invention to provide a structural adhesive with improved properties.

It is another object of this invention to provide a process for producing a varnish with improved heat stability properties.

These and other objects which will become evident in the course of the present disclosure have been accomplished by the formulation of compositions comprising a 3–75% by weight solution of a polyamine and a tetracarboxylic compound present in a proportion selected from the range of about 70% molar excess of the polyamine to about 5% molar excess of the tetracarboxylic compound; wherein the polyamine is selected from the class consisting of aliphatic primary diamines of from 2 to about 6 carbon atoms, aromatic primary diamines of from 6 to about 36 carbon atoms and aliphatic-aromatic primary diamines, triamines and mixtures of the foregoing, wherein the tetracarboxylic compound is formed from two molecules of trimellitic anhydride joined through their free carboxylic groups, wherein the carboxylic groups on the tetracarboxylic compounds are independently selected from the group consisting of carboxylic acid esters and free carboxylic acids.

The compositions are essentially organic liquid or aqueous solutions of at least one tetracarboxylic component and one polyamine component.

After application to a substrate and baking, the monomers condense to the resinous structures credited for the excellent properties enumerated earlier.

The following examples will serve to illustrate but not to limit the present invention.

EXAMPLE I

A quantity of 8.2 g. (0.020 mil) of the isomeric mixture of dianhydrides prepared from two mols of trimellitic anhydride and one mol of ethylene glycol diacetate, compounds known as TMX-220 [1], is reacted with anhydrous ethanol to produce the di-half ester isomers. After evaporation of the excess alcohol, the glassy, soft product is dissolved in 40 g. of a 1:1 mixture of cresylic acid and Solvesso 100. To this solution is added 6 g. (0.030 mol) of 4,4'-oxydianiline in 24 g. cresol.

The clear, stable solution is used to varnish coils according to the following procedure.

*Varnishing wire coils.*—The method used is an adaptation of that published by John Dexter in "Insulation," September 1955, page 12.

The coated wire samples are heat annealed for one hour at 200° C. The annealed wire is then closely wound on a ¼ inch diameter mandrel and cut into 3¾ inch long sections. These sections are dipped in the varnish and dried two hours at 100° C. and two hours at 175° C. Another reverse dip follows with the same drying cycle. A film build increase of 1 to 2 mils is accomplished in this manner. The varnished coils are finally cured for eight hours at 225° C.

*Bond strength determination.*—In this test, the varnished lengths of coil are laid flat on two fixed supports which are approximately two inches apart and a measured force is applied downwards on the coil until the coil breaks. Since the unvarnished coil's resistance to this treatment is negligible, the force needed to break the coils is essentially a measure of the flexural breaking strength of the cured varnish envelope. The test procedure is carried out with an Instron tester. A minimum flexural breaking strength of 5 lbs./mil of varnish thickness is considered acceptable for the purposes of this invention.

Bond strength is determined at room temperature and at higher temperatures. In the latter cases, the length of coil is heated by electrical current, the temperature being measured by a thermocouple pyrometer system. Once the desired temperature is reached, the bond strength is determined.

The following bond strength results were obtained by the method just described for "ML" enameled wire coiled and coated with the varnish of Example 1 and for purposes of comparison, for the same wire coated with "ML" varnish. "ML" varnish is a polymer solution containing about 15% solids of the uncured polymer and is available commercially for application to "ML" enameled coils. The results are given in pounds breaking strength at two different temperatures.

BOND STRENGTH OF VARNISHED COILS, POUNDS BREAKING STRENGTH

| Varnish | 25° C. (lbs.) | 180° C. (lbs.) | Film thickness (mils) |
|---|---|---|---|
| Example 1 | 21 | 9.5 | 0.7 |
| "ML" (control) | 8.5 | 6.5 | 1.5 |

The greater bond strength of the Example 1 varnish is evident. This is a rather significant improvement in electrical varnish especially in consideration of the centrifugal forces to which varnished coils are submitted during their performance in generators and motors. In estimating these results, it should be noted that the resulting cured film on double dipped coils in Example 1 is thinner than usual, i.e., 0.7 mil as opposed to the 1.5–2.0 mil normal thickness. Even with this low build, the varnish proves satisfactory as a coil binder and is better than a normally thick coat of "ML" varnish Control). On the other hand, these results may merely support a theory that has been advanced to the effect that the bonding strength of coil varnish is more a function of the nature of the bonding agent than that of the thickness of the coat, after a minimum thickness requirement is satisfied, of course.

An additional good feature of the Example 1 varnish lies in its compatibility with class 220° C. enameled wires. This compatibility can be demonstrated by comparing the one-kilovolt life of wires coated and varnished with the different enamels and varnishes.

---
[1] The structural formula of the compound may be generally represented as follows:

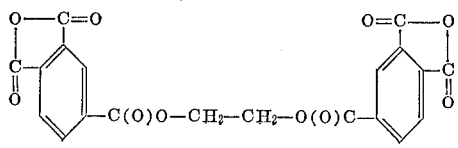

EXAMPLE 2

The excellent bonding properties of the varnishes of this invention can of course be used for many applications other than impregnation of magnet wire coils. This example for instance illustrates the employment of the varnishes in the lamination of glass cloth.

Style 181 glass cloth is double reverse-dipped twice in an Example 1 type varnish, force, dried, dipped once more and air dried. In all, five coats of varnish are thus applied to the cloth before laminating. The details of the process are as follows: The bare cloth is dipped in the varnish, allowed to drain in air for 15 minutes and dried for one hour at 100° C. and for one additional hour at 175° C. The cloth is then dipped again in the reverse or upside down direction and dried in the same manner. This constitutes one double dip. Two such double dips are given to each glass cloth piece and this is followed by an extra dip and drain at room temperature for 16 hours.

Four pieces of cloth thus treated are placed on top of one another and positioned in an electrically heated hydraulic press having 9.5 x 12.5 inch platens. Forty thousand pounds of gauge pressure at 400° F. for one hour produce a densely packed, fused laminate.

EXAMPLE 3

Example 2 is repeated here only using an impregnating composition prepared from equimolar amounts of the diethyl ester isomers of the trimellitic anhydride derivative used in Example 1 and methylene dianiline. The resulting laminate is comparable to that prepared in Example 2.

EXAMPLE 4

Example 2 is repeated here only using an impregnating composition prepared from equimolar amounts of the diethyl ester of isomers of the trimellitic anhydride derivative used in Example 1 and meta-phenylene diamine. The resulting laminate is comparable to that prepared in Example 2.

EXAMPLE 5

An impregnating solution is prepared by adding 8.31 g. (0.023 mol) of the mixed diester isomers of the trimellitic anhydride derivative used in Example 1 in 38.6 g. cresylic acid to a solution of 6.95 g. (0.035 mol), 4,4'-diaminodiphenylamine in 26.3 g. cresylic acid. This solution was applied to style 181 glass cloth by techniques similar to those described in Example 2. After a similar heat and pressure cycle, a rigid bonded glass laminate resulted. Similar results are obtained when an equimolar quantity of 4,4'-diaminodiphenylmethane is substituted for the diaminodiphenylamine in the preparation of the varnish.

EXAMPLE 6

20 grams of an isomeric mixture of dianhydrides prepared from two mols of trimellitic and one mol of ethylene glycol diacetate is refluxed for 15 hours in 61.2 g. anhydrous ethyl alcohol. The resulting solution is evaporated to dryness, leaving a soft, tacky mass of the diethyl ester isomers of the acids. A quantity of 6.4 g. (0.018 mol) of this product is dissolved in 26 g. cresol and the solution is mixed with 3.64 g. (0.018 mol) 4,4'-oxydianiline in 14.6 g. cresol.

This monomer solution was immediately applied to a sheet of cold rolled steel and baked for one hour at 300° C. in an oven. A clear, light yellow, tough, abrasion resistant, heat resistant and flexible film was produced which exhibits excellent weight loss properties upon baking at 300° C. for seventeen hours.

EXAMPLE 7

In this preparation, 26 g. of the ethyl alcohol solution of the diethyl esters of Example 6 is mixed with a solution of 2.65 (0.025 mol) of m-phenylene diamine in 22 g. water).

This monomeric mixture was immediately spread on a sheet of cold rolled steel and, after baking for one hour at 250° C. produced a clear, light yellow, tough, abrasion and heat resistant film which showed excellent weight loss properties when baked at 300° C. for 17 hours.

EXAMPLE 8

In this example, the varnish of Example 1 is used as structural adhesives in a technique related to the manufacture of honeycomb structures.

Two aluminum panels are first etched in dichromate cleaning solution, washed and dried. They are then coated with monomeric varnish by means of a brush. The varnish layer is dried for 30 minutes at 120° C., 30 minutes at 150° C. and 30 minutes at 200° C. A cure for 10 minutes at 300° C. follows. Another layer of the same varnish is then brushed on the cured film and dried for 30 minutes at 100° C. A third layer is applied in the same manner and dried at 50° C., overnight for instance. Thus, at this stage, each panel is covered by one curved layer of resin next to the metal and two incompletely cured layers on top.

The two panels are then pressed together in such a position that a half-inch wide contact is made between them. They are clamped in a steel assembly. Curing is then accomplished under a pressure of 5 pounds per square inch at 300° C. for one hour.

The glued panels are then cut and tested for shear strength, and found to have excellent adhesive properties which demonstrates the usefulness of the present monomeric solutions for bonding aluminum panels, especially at high temperatures, even though no attempt has been made to refine the technique and the selection of monomers with a view to the obtention of optimum results.

The following Examples 9–14 illustrate that coating systems prepared from dicarboxylic-dicarbalkoxy monomers other than the types peculiar to this invention do not posess the useful properties of the latter. In these examples the curing time was curtailed on evidence of unsatisfactory film formation.

EXAMPLE 9

A mixture of 20 g. pyromellitic dianhydride (PMDA), recrystallized from acetic anhydride, and 40 g. anhydrous ethanol is refluxed 16 hours. To this reaction product, actually a mixture of the two isomers of diethyl pyromellitate, is added 18.35 g. 4,4'-oxydianiline in 150 g. methyl ethyl ketone. A clear, 16.7% solids by weight solution results.

Samples of this solution are placed on cold rolled steel with a film casting bar and baked in ovens. One sample is baked for one hour at 180° C. and another for 15 minutes at 300° C. Neither specimen gives a clear, continuous film. The solution cures to an opaque mass with poor flexibility and poor abrasion resistance.

EXAMPLE 10

The reaction product of pyromellitic dianhydride (PMDA) and ethanol, as described in Example 9 above, is evaporated to dryness at 70–100° C. A quantity of 15.5 g. of the dry diethyl esters is added to 51 g. dimethyl acetamide. To this in turn is added 10.0 g. 4,4'-oxydianiline (ODA) in 51 g. N-methylpyrrolidone. The 20% by weight solution, after application to cold rolled steel, is then baked out at 300° C. for 15 minutes. An opaque, nonflexible, easily abraded product results.

EXAMPLE 11

7.27 grams of pyromellitic dianhydride (PMDA) is refluxed in 19.7 g. anhydrous ethanol for several hours. The excess alcohol is evaporated from the solid di-half esters at 100° C. and the resulting powder added to 27.8 g. cresylic acid. To this is added a solution of 8.33 g. 4,4'-oxydianiline (ODA) in 31.7 g. cresylic acid.

This 20% solids by weight solution when baked out in the manner of Examples 9 and 10 gives essentially the same opaque discontinuous film obtained in those examples.

EXAMPLE 12

Pyromellitic dianhydride is reacted with anhydrous methanol to produce the dimethyl ester of pyromellitic acid. To 2.82 g. of the diester in 4.5 g. methanol is added 2.10 g. 4.4'-oxydianiline (ODA) in 7 g. N-methylpyrrolidone. The resulting clear solution is baked out for 30 minutes at 175° C. or for 15 minutes at 300° C. In either case, an opaque, discontinuous mass forms that cannot qualify as a film.

EXAMPLE 13

A solution of 3.66 g. of the dibutyl ester of pyromellitic acid in 3.5 g. butanol is added to 2.10 g. 4,4'-oxydianiline in 10 g. N-methylpyrrolidone. This clear solution, when baked at 175° C. for 30 minutes gives the same unsatisfactory product as that of Example 12.

EXAMPLE 14

The tetramethyl ester of pyromellitic acid was also found not to react with oxydianiline in monomeric form to produce a useful film. The ester, 12.4 g., in 40 g. of a 1:1 by weight mixture of cresylic acid and Solvesso 100 is added to 8.8 g. 4,4'-oxydianiline in 41.5 g. cresylic acid. The clear solution, when baked out at 180° C. on cold rolled steel for one hour or at 300° C. for 15 minutes, gives a discontinuous, powder ymass lacking adhesion and flexibility.

The results of Examples 9–14 clearly demonstrate that the esters of pyromellitic acid cannot be compounded into a monomeric coating solution with oxydianiline which will cure to satisfactory films as is possible with the isomers of the di-half esters of dianhydride-forming isomers of benzophenone tetracarboxylic acid as well as those of the tetracarboxylic acids based on trimellitic anhydride.

EXAMPLE 15

This example is also designed to show the further advantages of the monomeric solutions of this invention over preformed polymer coating compositions.

Benzophenonetetracarboxylic acid dianhydride, 16.1 g. is added to 37.1 g. dimethylacetamide and the mixture heated to 50° C. with stirring. To this is added in turn 10 g. 4,4'-oxydianiline in 37.1 g. dimethylacetamide. The starting materials have been recrystallized several times and dried thoroughly. The solvent is dry. Stirring is continued for two hours and the viscous polymer solution diluted to 10% by weight total solids with N-methylpyrrolidone. The inherent viscosity of the reaction product is approximately 1.0.

This varnish was used to bond wire coils as in Example 1. The bond strength data for the usual 1.5–2.0 mil thick coat is listed below.

Bond strength of coil varnish, pounds breaking strength

| Varnish: | 25° C., lbs. |
|---|---|
| Example 1 (monomeric solution) | 21 |
| Example 15 (polymeric solution) | 13.5 |

These figures show, as the "ML" varnish data of Example 1 does, that polymeric coating systems based on dianhydrides and diamines condensed to polyamides are not as good for bonding as the monomeric preparations. Such polyamide solutions however can be quite useful in other applications such as wire enameling and so on.

As mentioned earlier, the varnishes and solutions of this invention contain at least one compound selected from each of two classes of monomers, i.e., tetracarboxylic compound and a polyamino compound.

The tetracarboxylic compounds used in the practice of this invention is a tetracarboxylic, two benzenoid ring structure formed from two molecules of trimellitic anhydride joined through their free carboxylic groups, wherein the carboxylic groups on the tetracarboxylic compound are independently selected from the group consisting of carboxylic acid esters and free carboxylic acids.

These trimellitic derivatives are obtained by the condensation of two mols of trimellitic anhydride with one mol of another compound which is at least difunctional. The resulting tetracarboxylic structure therefore consists of two benzene rings, each having two carboxyl group substituents attached to adjacent carbon atoms, and joined together by any of the following linkages; amide, ester and thioester. Examples of specific compounds of this class are the condensation products of two mols of trimellitic anhydride with one mol of such molecules as glycol diacetate, triacetin, tolylene diisocyanate, methylene - bis(4 - phenylisocyanate) and oxy - bis(4 - phenylisocyanate) and a bisphenol such as 2,2-bis(p-hydroxyphenyl)propane. Similarly, other tetracarboxylic monomers may be obtained from trimellitic anhydride and derivatives of compounds such as ethanolamine, oxydianiline, phenylene diamine, diaminodiphenylamine, diaminodiphenylmethane, diaminodiphenylpropane, ethylene dithiol, 1 - thioglycerol,α,α - dimercapto p - xylene, 4,4'-diaminobenzophenone, and the like.

These trimellitic derivatives may be generally represented by the following structural formula:

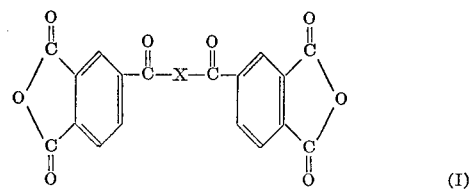

(I)

wherein X represents any of the compounds recited above, which are at least difunctional and which react with the two mols of trimellitic anhydride joining them together by either amide, ester or thioester linkages.

Prior to use in the practice of this invention, the anhydride structure on either the trimellitic anhydride or the derivatives of trimellitic anhydride must be converted to form carboxylic acid ester or free carboxylic acid components by any of the methods well known to those skilled in the art. The resulting tetracarboxylic structure which is used in the practice of this invention may be generally represented by the following structural formula:

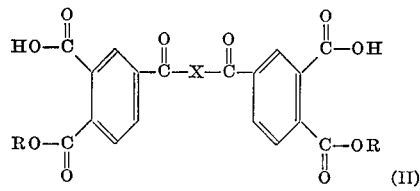

(II)

wherein R is independently selected from the group consisting of hydrogen and alkyl of from 1 to 6 carbon atoms.

The carboxylic acid component of the present coating compositions is preferably an ester derivative prepared by the reaction of the corresponding dianhydride with an alkyl alcohol of 1 to about 6 carbon atoms, however, the free acid may also be used.

In the following Examples 16–17 the general procedure of Example 1 is followed using 4,4'-oxydianiline as the polyamine component and various diethyl esters of trimellitic anhydride derivatives. In each case the trimellitic anhydride derivative is prepared by reacting two mols of trimellitic anhydride with one mol of the difunctional compound which compound is illustrated in the following table. In each case the monomeric solution was found to be comparable to that of Example 1.

TABLE.—SUMMARY OF EXAMPLES 16–21

| Example | Difunctional compound used to prepare trimellitic derivative | X in Formulae I and II |
|---|---|---|
| 16 | Triacetin | −O−CH₂−C(CH₃)(OC=OH)−CH₂−O− |
| 17 | Tolylene diisocyanate. | −N(H)−C₆H₄−N(H)− |
| 18 | 4,4′-oxydianiline. | −N(H)−C₆H₄−O−C₆H₄−N(H)− |
| 19 | p-Phenylene diamine. | −N(H)−C₆H₄−N(H)− |
| 20 | Ethylene dithiol. | −S−CH₂−CH₂−S− |
| 21 | 4,4′-diaminobenzophenone. | −N(H)−C₆H₄−C(=O)−C₆H₄−N(H)− |

Although any of the primary diamines can be employed as the second necessary monomeric component of the solutions and varnishes of this invention, the actual selection of such a component will depend of course on the properties that are needed in the final cured resin. Properties to be considered in this respect are resistance to heat, adhesion to the substrate to be coated—be it class 220° C. enameled wire, glass cloth, cold rolled steel or something else, flexibility, abrasion resistance, and so on. With this in mind, the primary diamines that may be selected to react with the carboxylic compounds of the present preparations are saturated aliphatic diamines containing from 2 to 6 carbon atoms, aromatic diamines containing from 6 to 16 carbon atoms and mixed aliphatic-aromatic diamines containing from 7 to 36 carbon atoms. Included in these classes are the diamines of the bivalent radicals of such compounds as benzene, xylene, toluene, naphthalene, biphenyl, diphenyl ether, ditolyl ether, diphenyl sulfide, diphenylamine, diphenyl sulfone, diphenylmethane, diphenylpropane, benzophenone; also included are hexamethylene diamine, octamethylene diamine, 3-methoxy-hexamethylene diamine, 2,5-diamino-1,3,4-oxadiazole, etc.

Other useful diamino compounds are 4,4′-thioaniline diphenyl ether, oxydianiline, methylene dianiline, 4,4′-diaminotriphenylamine, polymethylene polyaniline made by the reaction of aniline with formaldehyde:

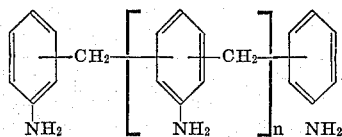

where (n) can vary from 0 to 3; the reaction products of diacyl halides with excess diamines:

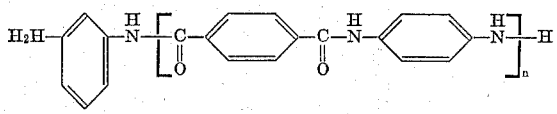

where n may be 1 to 4. Other similar compounds which lead to greater cross-linking of the ultimate polymer chains on curing can also be included provided that they do not react with the solution components before curing.

The preferred diamines can be represented by the general formula:

$$H_2N—R_2—NH_2$$

wherein R₂ may be

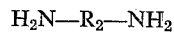
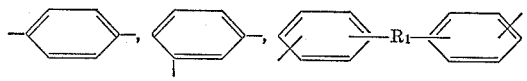
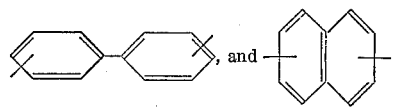

wherein R₁ is selected from the group consisting of carbonyl, sulfur, sulfonyl, oxygen, phosphonyl, phosphorous, silicon and derivatives thereof, alkylene of from 1 to 6 carbon atoms and arylene of from 6 to 16 carbon atoms.

Especially preferred diamines are the 4,4′-oxydianiline, meta and para phenylene diamines, and methylene dianiline.

Useful solvents with which to prepare the monomeric solutions disclosed include inert organic liquids such as the lower alkyl alcohols (1–6 carbon atoms), acetone, methyl ethyl ketone, dioxiane, cresol, toluol, N-methylpyrrolidone, dimethylacetamide, dimethylformamide, high boiling petroleum hydrocarbons and mixtures thereof. Mixture of water with certain organic liquids such as acetone and ethyl alcohol may be used where the solubility of the particular monomers permit.

The solids content of the solutions may range from 3 to 75% by weight, although most coating applications are more economically carried out with solutions containing 15 to 60% solids. In the case of electrical varnishes, solids contents of 20–60% have been found most satisfactory. Within these limits, the exact concentration used ultimately hinges on the thickness of the coating desired. In general, it should be noted that because of the monomeric nature of the reactants in these solutions, a greater range of usable concentrations is available since the viscosity problems encountered with polymeric materials is minimized. Intimate mixtures of the dry solid monomers may also be used for certain operations such as molding powders, fluid bed coating of various materials, etc.

The following Example 22 illustrates the use of the compositions of this invention as molding powders.

EXAMPLE 22

An equimolar 2B ethanol solution of the diethyl ester isomers of the trimellitic anhydride derivative used in Example 1 and m-phenylene diamine is evaporated to dryness using a Rinco evaporator at 50° C. and partial vacuum. This intimate mixture of dry solid reactants is then pre-heated at 110° C. for 5 hours, at 135° C. for 5 hours, ground to a fine powder, and then presses in a mold for one hour at 13,000 p.s.i. and 600° F. to give a disc having a diameter of 2¼ inches and a height of ¼ inch. This disc is then post cured at 300° C. for 9 hours with only a small weight loss.

The proportions of monomers can vary, on a molar basis from about a 5% excess of the di-half ester compound to about a 70% excess of the diamine. Preferred however are chemically equivalent amounts of both types of monomers or a molar excess of the amine monomer of up to 50%.

The monomeric coating of this invention may be curved at any temperature within the range of 125° to 400° C. The actual temperature selected will depend on the heat resistance of the substrate coated, the time of cure desired, the cost factor in operating high temperature ovens, the type of equipment employed, the flexural breaking strength that the cured resin need achieve and the particular monomers employed. In general the range of 150° to 225° C. will be most economical for the majority of possiblie applications.

While most of the applications disclosed in the present specification require the use of solutions of monomers followed by "in situ" condensation, it must be pointed out that the condensation of varients of these monomers can be caused, by heat, to take place in the solution to yield polyamides which may be applied to a substrate and then cured into useful resins. Such polymeric solutions and methods for their preparation have already been disclosed in U.S. Pat. 3,190,856.

It has now been established that solutions of the polyamides can be obtained in such solvent systems as cresylic acid-phenol-water. Given the type of reaction involved, and the hydroxylic nature of the solvents just mentioned, that the condensation of anhydride functions with amino groups can occur at all is rather unexpected. Be that as it may, it has been found that if such a system is heated at temperatures ranging from 85° to 125° C., polymeric solutions will be obtained which have a Brookfield viscosity of up to 9000 centipoises at 25° C. Prolonged heating at those temperatures should be avoided prior to final application. The exact period of heating will depend of course on the temperature selected and in general should be approximately 30 minutes. Preferred conditions for this polymeric solution system are chemically equivalent proportions of monomers, and an initial polymerization charge containing 30–50% by weight of reactants which can be ultimately diluted to a 15–40% solids by weight polymeric solution.

The solution of this invention can be used, as shown by the examples as varnishes for electrical equipment, in the manufacture of a glass laminate for printed circuits, as structural adhesives, and so on.

It is evident also that their excellent combination of properties such as ease of application, stability on storage, wide range of available concentrations, relatively low cost, as well as the remarkably heat resistant cured products which they form, will suggest many other uses to those skilled in the art. For instance, the solutions may be employed to impregnate various natural and synthetic fabrics other than glass cloth. They can be used as wire enamels. Furthermore, the flexibility of thin films (less than 2 mil) of the cured resins yielded by these solutions suggests their employment in metallic foil and strip coating for electric capacitors and distribution transformers of advance type.

It is obvious that many deviations may be made in the products and processes set forth above without departing from the scope of this invention.

What is claimed is:

1. A composition comprising a 3 to 75 percent by weight solution of a polyamine and a tetracarboxylic compound present in a proportion selected from the range of about 70 percent molar excess of the polyamine to about 5 percent molar excess of the tetracarboxylic compound; wherein the polyamine is selected from the group consisting of aliphatic primary diamines of from 2 to about 6 carbon atoms, aromatic primary diamines of from 6 to about 36 carbon atoms and aliphatic-aromatic primary diamines, triamines and mixtures thereof; wherein the tetracarboxylic compound is the dialkyl ester derivative of the condensation products of (a) two molecules of trimellitic anhydride and (b) one molecule of a second compound which is at least difunctional wherein in the resulting condensation product the two molecules of trimellitic anhydride are linked through the residue of their free carboxylic acid groups with the residue of the one molecule of the second compound by a linkage selected from the group consisting of amide, ester and thioester linkages; and wherein the alkyl groups of the dialkyl ester derivative are aliphatic radicals of from 1 to 6 carbon atoms.

2. The composition of claim 1 wherein the primary diamine is represented by the general formula $$H_2N-R_2-NH_2$$

wherein $R_2$ is a divalent aromatic radical.

3. The composition of claim 1 wherein the polyamine component is selected from the group consisting of metaphenylene diamine, para-phenylene diamine, 4,4'-oxydianiline and methylene diamine and mixtures thereof.

4. The composition of claim 1 wherein the tetracarboxylic component is a dialkyl ester corresponding to the following general formula

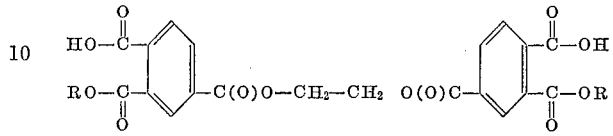

wherein R is selected from the grup consisting of alkyl radicals of from 1 to 6 carbon atoms.

5. The composition of claim 1 wherein the second compound, which is reacted with the trimellitic anhydride, is selected from the group consisting of ethylene glycol, glycol diacetate, triacetin tolylene diisocyanate, methylene-bis(4 - phenylisocyanate), oxy-bis-(4-phenylisocyanate), 2,2-bis(p-hydroxyphenyl)propane, ethanolamine, 4,4'-oxydianiline, phenylene diamine, diaminodiphenylamine, diaminodiphenylmethane, diaminodiphenylpropane, ethylene dithiol, 1-thioglycerol, α,α-dimercapto-p-xylene and 4,4'-diaminobenzophenone.

6. The composition of claim 4 wherein R is an ethyl radical.

7. A composition comprising a 3 to 75 percent by weight solution of a polyamine and a tetracarboxylic compound present in a proportion selected from the range of about 70 percent molar excess of the polyamine to about 5 percent molar excess of the tetracarboxylic compound; wherein the polyamine is selected from the group consisting of aliphatic primary diamines of from 2 to about 6 carbon atoms, aromatic primary diamines of from 6 to about 36 carbon atoms and aliphatic-aromatic primary diamines, triamines and mixtures thereof; wherein the tetracarboxylic compound is the dialkyl ester derivative of the condensation product of (a) two molecules of trimellitic anhydride and (b) one molecule of a second compound which is selected from the group consisting of ethylene glycol, glycol diacetate, triacetin, tolylene diisocyanate, methylene-bis(4-phenylisocyanate), oxybis(4-phenylisocyanate), 2,2 - bis(p-hydroxyphenyl)propane, ethanolamine, 4,4'-oxydianiline, phenylene diamine, diaminodiphenylamine, diaminodiphenylmethane, diaminodiphenylpropane, ethylene dithiol, 1-thioglycerol, α,α-dimercapto-p-xylene and 4,4'-diaminobenzophenone wherein in the resulting condensation product the two molecules of trimellitic anhydride are linked through the residue of their free carboxylic acid groups with the residue of the one molecule of the second compound by a linkage selected from the group consisting of amide, ester and thioester linkages; and wherein the alkyl groups of the dialkyl ester derivative are aliphatic radicals of from 1 to 6 carbon atoms.

8. A composition comprising a 3 to 75 percent by weight solution of an aromatic diprimary amine and a tetracarboxylic compound present in a proportion selected from the range of about 70 percent molar excess of the diamine to about 5 percent molar excess of the tetracarboxylic compound; wherein the diamine is selected from the group consisting of metaphenylene diamine, paraphenylene diamine, 4,4'-oxydianiline and 4,4'-methylene dianiline; wherein the tetracarboxylic compound is the dialkyl ester derivative of the condensation product of (a) two molecules of trimellitic anhydride and (b) one molecule of a second compound which is selected from the group consisting of ethylene glycol, glycol diacetate, triacetin, tolylene diisocyanate, methylene-bis(4-phenylisocyanate), oxy-bis(4-phenylisocyanate), 2,2 - bis(p-hydroxyphenyl)propane, ethanolamine, 4,4' - oxydianiline, phenylene diamine, diaminodiphenylamine, diaminodiphenylmethane, diaminodiphenylpropane, ethylene dithiol, 1-thioglycerol, α,α-dimercapto-p-xylene and 4,4'- diaminobenzophenone wherein in the resulting condensation product the two molecules of trimellitic anhydride are linked through the residue of their free carboxylic acid groups with the residue of the one molecule of the second compound by a linkage selected from the group consisting of amide, ester and thioester linkages; and wherein the alkyl groups of the dialkyl ester derivative are aliphatic radicals of from 1 to 6 carbon atoms.

9. The composition of claim 8 wherein the diamine is meta-phenylene diamine or para-phenylene diamine.

10. The composition of claim 9 wherein the dialkyl ester is a diethyl ester.

11. The composition of claim 10 wherein the tetracarboxylic compound is the reaction product of trimellitic anhydride and ethylene glycol.

12. A glass laminate consisting of multiple layers of glass fibers bonded by heat and pressure, each layer having previously been impregnated with a composition comprising a 3 to 75 percent by weight solution of an aromatic diprimary amine and a tetracarboxylic compound present in a proportion selected from the range of about 70 percent molar excess of the diamine to about 5 percent molar excess of the tetracarboxylic compound; wherein the diamine is selected from the group consisting of metaphenylene diamine, paraphenylene diamine, 4,4'-oxydianiline and 4,4'-methylene dianiline; wherein the tetracarboxylic compound is the dialkyl ester derivative of the condensation product of (a) two molecules of trimellitic anhydride and (b) one molecule of a second compound which is selected from the group consisting of ethylene glycol, glycol diacetate, triacetin, tolylene diisocyanate, methylene-bis(4 - phenylisocyanate), oxy-bis(4 - phenylisocyanate), 2,2 - bis(p - hydroxyphenyl) propane, ethanolamine, 4,4'-oxydianiline, phenylene diamine, diaminodiphenylamine, diaminodiphenylmethane, diaminodiphenylpropane, ethylene dithiol, 1-thioglycerol, α,α-dimercapto-p-xylene and 4,4'-diaminobenzophenone wherein in the resulting condensation product the two molecules of trimellitic anhydride are linked through the residue of their free carboxylic acid groups with the residue of the one molecule of the second compound by a linkage selected from the group consisting of amide, ester and thioester linkages; and wherein the alkyl groups of the dialkyl ester derivative are aliphatic radicals of from 1 to 6 carbon atoms.

13. The composition of claim 12 wherein the diamine is meta-phenylene diamine or para-phenylene diamine.

14. The composition of claim 13 wherein the dialkyl ester is a diethyl ester.

15. The glass laminate of claim 12 wherein the tetracarboxylic component is an alkyl ester corresponding to the following general formula:

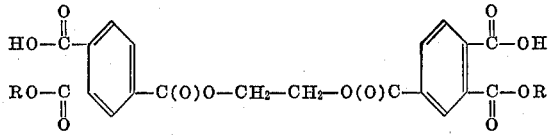

wherein R is an ethyl radical.

16. Substrates coated with a composition comprising a 3 to 75 percent by weight solution of an aromatic diprimary amine and a tetracarboxylic compound present in a proportion selected from the range of about 70 percent molar excess of the diamine to about 5 percent molar excess of the tetracarboxylic compound; wherein the diamine is selected from the group consisting of metaphenylene diamine, paraphenylene diamine, 4,4'-oxydianiline and 4,4'-methylene dianiline; wherein the tetracarboxylic compound is the diethyl ester derivative of the condensation product of (a) two molecules of trimellitic anhydride and (b) one molecule of a second compound which is selected from the group consisting of ethylene glycol, glycol diacetate, triacetin, tolylene diisocyanate, methylene-bis(4-phenylisocyanate, oxy - bis(4-phenylisocyanate), 2,2-bis(p - hydroxyphenyl)propane, ethanolamine, 4,4'-oxydianiline, phenylene diamine, diaminodiphenylamine, diaminodiphenylmethane, diaminodiphenylpropane, ethylene dithiol, 1-thioglycerol, α,α-dimercapto-p-xylene and 4,4'-diaminobenzophenone wherein in the resulting condensation product the two molecules of trimellitic anhydride are linked through the residue of their free carboxylic acid groups with the residue of the one molecule of the second compound by a linkage selected from the group consisting of amide, ester and thioester linkages.

17. A composition suitable for use as a molding powder, fluid bed coating and other related uses which comprises an intimate mixture of a polyamine and a tetracarboxylic compound present in a proportion selected from the range of about 70 percent molar excess of the polyamine to about 5 percent molar excess of the tetracarboxylic compound; wherein the polyamine is selected from the group consisting of aliphatic primary diamines of from 2 to about 6 carbon atoms, aromatic primary diamines of from 6 to about 36 carbon atoms and aliphatic-aromatic primary diamines, triamines and mixtures thereof; wherein the tetracarboxylic compound is the dialkyl ester derivative of the condensation product of (a) two molecules of trimelitic anhydride and (b) one molecule of a second compound which is at least difunctional wherein in the resulting condensation product the two molecules of trimellitic anhydride are linked through the residue of their free carboxylic acid groups with the residue of the one molecule of the second compound by a linkage selected from the group consisting of amide, ester and thioester linkages; and wherein the alkyl groups of the dialkyl ester derivative are aliphatic radicals of from 1 to 6 carbon atoms.

18. The composition of claim 17 wherein the second compound, which is reacted with the trimellitic anhydride, is selected from the group consisting of ethylene glycol, glycol diacetate, triacetin, tolylene diisocyanate, methylene-bis(4-phenylisocyanate), oxy - bis(4 - phenylisocyanate), 2,2-bis(p - hydroxyphenyl)propane, ethanolamine, 4,4'-oxydianiline, phenylene diamine, diaminodiphenylamine, diaminodiphenylmethane, diaminodiphenylpropane, ethyllene dithiol, 1-thioglycerol, α,α-dimercapto-p-xylene and 4,4'-diaminobenzophenone.

19. The composition of claim 17 wherein the primary diamine is represented by the general formula

$$H_2N-R_2-NH_2$$

wherein $R_2$ is a divalent aromatic radical.

20. The composition of claim 17 wherein the polyamine component is selected from the group consisting of meta-phenylene diamine, para-phenylene diamine, 4,4'-oxydianiline and methylene diamine and mixtures thereof.

21. The composition of claim 17 wherein the tetracarboxylic component is a dialkyl ester corresponding to the following general formula:

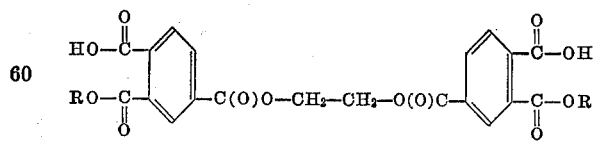

wherein R is selected from the group consisting of alkyl radicals of from 1 to 6 carbon atoms.

22. A composition suitable for use as a molding powder, fluid bed coating and other related uses which comprises an intimate mixture of an aromatic diprimary amine and a tetracarboxylic compound present in a proportion selected from the range of about 70 percent molar excess of the diamine to about 5 percent molar excess of the tetracarboxylic compound; wherein the diamine is selected from the group consisting of metaphenylene diamine, paraphenylene diamine, 4,4'-oxydianiline and 4,4'-methylene dianiline; wherein the tetracarboxylic compound is the diethyl ester derivative of the condensation product of (a) two molecules of trimellitic anhydride and (2) one molecule of a second compound which is selected from the group consisting of ethylene glycol, glycol diacetate, triacetin, tolylene diisocyanate, methylene-bis-(4-phenylisocyanate), oxy-bis(4-phenylisocyanate), 2,2-bis(p-hydroxyphenyl)propane, ethanolamine, 4,4'-oxydianiline, phenylene diamine, diaminodiphenylamine, diaminodiphenylmethane, diaminodiphenylpropane, ethylene dithiol, 1-thioglycerol, α,α-dimercapto-p-xylene and 4,4'-diaminobenzophenone wherein in the resulting condensation product the two molecules of trimellitic anhydride are linked through the residue of their free carboxylic acid groups with the residue of the one molecule of the second compound by a linkage selected from the group consisting of amide, ester and thioester linkages.

References Cited

UNITED STATES PATENTS 3,347,808  10/1967  Lavin et al. _____ 260—29.1

MORRIS LIEBMAN, Primary Examiner

R. ZAITLEN, Assistant Examiner

U.S. Cl. X.R.

117—230, 232; 260—37, 78